United States Patent [19]

Hudecek et al.

[11] 4,087,396

[45] May 2, 1978

[54] METHOD FOR PRODUCING THE HYDROPHILIC FILLER FOR PLASTICS

[75] Inventors: Slavko Hudecek; Ivana Gavrilová; Miroslav Beran, all of Prague; Frantisek Juracka, Pardubice, all of Czechoslovakia

[73] Assignee: Ceskoslovenska akademie ved, Prague, Czechoslovakia

[21] Appl. No.: 662,711

[22] Filed: Mar. 1, 1976

[30] Foreign Application Priority Data

Mar. 5, 1975 Czechoslovakia .................. 1472/75

[51] Int. Cl.² ............................................. C08L 31/00
[52] U.S. Cl. ............................ 260/29.6 H; 260/2.5 R; 260/23 AR; 260/23 R; 260/29.6 E; 260/29.6 AT; 260/30.6 R; 260/31.2 R; 260/31.8 R; 260/31.8 G; 260/33.4 R; 260/34.2
[58] Field of Search .................. 260/23 H, 23 R, 42, 260/30.6 R, 31.2 R, 31.8 R, 34.2 R; 526/82; 11/184

[56] References Cited

U.S. PATENT DOCUMENTS

| Re. 23,757 | 12/1953 | Pike ................................... 260/23 R |
| 2,397,751 | 4/1946 | Rand ................................... 260/23 R |
| 2,923,692 | 2/1960 | Ackerman et al. ............. 260/29.6 H |
| 3,404,110 | 10/1968 | Hunt et al. ...................... 260/29.6 E |

OTHER PUBLICATIONS

"Skeist" Handbook of Adhesives, 1962, pp. 326 & 327 relied on.

*Primary Examiner*—Melvyn I. Marquis

[57] ABSTRACT

A mixture of monomers, at least one of which contains 1 or 2 —COOH groups and the other one of which contains more than 1 vinyl group in the molecule, is polymerized by means of radical polymerization in the medium of a plasticizer or a mixture of plasticizers having saturated higher fatty acids or/and unsaturated higher fatty acids (either plain or halogenated) and/or higher alcohols. The product is transferred into the Na, K or $NH_3$ form, the content of plasticizer is reduced to 20 – 70 wt. % (e.g. by centrifugation) or water is removed (e.g. azeotropic or vacuum distillation). The product is suitable, above all, in manufacturing of hygienic artificial leathers.

11 Claims, No Drawings

METHOD FOR PRODUCING THE HYDROPHILIC FILLER FOR PLASTICS

The invention relates to a method for producing the powdered hydrophilic filler, so called dry blend, for plastics, particularly a filler for poly(vinyl chloride).

Addition of fillers into plastics enables the resulting material to have beneficial properties, which the original plastic material does not possess. For example, the thermal stability may be increased by mineral fillers, impact strength by fibrous fillers, and the like.

Recently, some types of plastics, useful particularly as substitutes for natural leather, are required to have a certain degree of hydrophilicity. The sorption properties of some natural materials which possess this hydrophility, as e.g. wood, cellulose, starch, and others, are rather low and their use causes deterioration of the physical and mechanical properties of the plastics due to the necessary high degree of filling required.

Synthetic hydrophilic fillers have special importance in the manufacture of plastic leathers having so called hygienic properties. They may be prepared in a dry powdered form either by grinding of a suitable hydrophilic polymer, for example under deep cooling, or by the direct procedure according to Czechoslovak U.S. Pat. No. 160,338. However, this procedure is economically disadvantageous, because of loss of the solvents and the necessity to go through several operations in different equipment. Furthermore, powdered filler prepared in this way has a strong tendency to aggregate formng agglomerates which can be spread only with difficulty. Their use leads to surface defects in the final product, e.g. artificial leather.

The above mentioned shortcomings are overcome with production of powdered hydrophilic filler for plastics according to this invention.

According to the present invention, a dry mixture of synthetic filler and plasticizer, a so called dry blend is formed containing 30 – 70 wt.% of the anhydrous synthetic hydrophilic filler produced by polymerizaton of a mixture of monomers, at least one of which contains one or two carboxylic groups or in the form of anhydride and another of which contains more than one vinyl group, subsequently transfered into the Na, K or NH$_4$ form, and 20 – 70 wt. % of a plasticizer or a mixture of plasticizers and the rest of water. The filler may advantageously contain up to 20% of water as a blowing agent.

To remove agglomerates and to modify the size of particles, the powdered hydrophilic filler may also contain up to 2% of higher alcohols and/or higher saturated fatty acids and/or higher unsaturated fatty acids either plain or halogenated.

The hydrophilic filler may further contain the known admixtures, as for example pigments, stabilizers, blowing agents and catalysts of decomposition.

The powdered hydrophilic filler according to the invention is produced in such way, that a mixture of monomers, at least one of which contains one or two carboxylic groups, if need be in the form of anhydride, and another of which contains more than one vinyl group, is polymerized in the medium consisting of a plasticizer of a mixture of plasticizers with addition of higher saturated fatty acids or/and higher unsaturated fatty acids, either plain or halogenated and/or higher alcohols, either single or in a mixture, in the presence of initiators of radical polymerization, and the resulting polymer is transferred into the Na, K or NH$_4$ form without isolation, and the content of the plasticizer is then lowered to 20 – 70 wt. %, for example, by centrifugation, or water is removed, for example, by azeotropic or vacuum distillation.

The halogenated saturated or/and unsaturated higher fatty acid, contains preferably 1 to 4 halogen atoms per one acid molecule, advantageously chlorine or bromine.

Lauric acid, palmitic acid or stearic acid are preferably used as the higher saturated fatty acids. Oleic acid, elaidic acid, linoleic acid and linolenic acid are prefered as higher unsaturated fatty acids.

As higher alcohols there are advantageously used octanol, iso-octanol, dodecylalcohol, cetylalcohol, etc.

The plasticizers used are preferably phthalates, adipates, azelates, sebacates, citrates, phosphates, and the like, e.g. dibutyl phthalate, dioctyl phthalate, ethyl hexyl phthalate, butyl benzyl phthalate, diisooctyl phthalate, dioctyl adipate, dioctyl sebacate, idisooctyl azelate, triethyl citrate, benzyl octyl adipate, tributyl citrate, tricresyl phosphate, diphenyl cresyl phosphate, diphenyl octyl phosphate, and the like.

The monomers containing one or two carboxylic groups may be methacrylic acid, acrylic acid, fumaric acid, maleic acid, or maleic anhydride alpha-ethyacrylic acid, citraconic acid, crotonic acid, α-chlorocrotonic acid, mesaconic acid, itaconic acid, ethylmaleic acid, and others.

The monomer which contains more than one vinyl group is preferably selected from the group comprising ethylene glycol dimethacrylate or diacrylate, diethylene glycol dimethacrylate, glycol divinyl ether, divinyl adipate, alkyl vinyl ether, dialkyl fumarate, divinyltoluene, trivinylbenzene, divinylnaphthalene, triallyl cyanurate, divinylbenzene, and the like.

The copolymerization of the above given monomers may be initiated with the common types of initiators for radical polymerization, as for example, with dialkyl or diaryl peroxides, azobisisobutyronitrile, hydroperoxides and peroxocarbonates.

The conversion into the Na, K or NH$_4$ form is carried out without isolation of the formed polymer, preferably by means of aqueous or alcoholic solutions of the corresponding hydroxides, carbonates, or alkoxides.

The surprising fact is that the products prepared according to the invention are powdery in spite of the content of plasticizers, which is considerably high in some cases, do not tend to agglomeration during storage, and therefore enable easy handling at weighing, transport and mixing into final blends with plastics. As high temperatures (about 70° C) are not applied during preparation, the product retains its original optimal distribution of the particle size.

Another advantage of the fillers consists in their composition which takes account of the requirement of combinations of various plasticizers for use in natural leather substitutes for variation of mechanical and physical properties of the final product.

The invention is further illustrated in several examples without, however, limiting its scope to them.

EXAMPLE 1

A 200 ml glass flask equipped with a stirrer, thermometer, reflux condenser and an inlet of inert gas was stepwise charged with the following components:

| | |
|---|---|
| diisooctyl phthalate | 80.00 g |
| stearic acid | 0.40 g |
| dibenzoyl peroxide | 0.60 g |

-continued

| methacrylic acid (distilled) | 16.00 g |
| divinylbenzene | 6.64 g. |

The reaction mixture was bubbled-through 15 minutes with nitrogen and then the temperature was raised to 60° ± 0.5° C by means of an oil bath under continuous stirring. The first turbidity developed after 1½ hour. The reaction was carried out under stirring for 7 hours and then the mixture was cooled. Transformation into the Na form was completed in a mortar with the solution of 8.32 g NaOh in 10 ml of water. The pasty mixture was then centrifuged in the laboratory centrifuge CHIROTA at 1325 r.p.m. The resulting loose powdery product consists of:

Copolymer of methacrylic acid and divinylbenzene

| in the Na form | 31.7 wt.% |
| Water | 14.4 wt.% |
| Diisooctyl phthalate | 53.9 wt.% |

EXAMPLES 2 to 5

The basic suspension of crosslinked poly(sodium methacrylate) is diisooctyl phthalate was prepared in the same way as in Example 1 and was centrifuges at various revolutions of the centrifuge. The final compositions of loose products are given in Table I together with their sorption capacity for water vapor at the 90% relative humidity (the equilibrium sorption is given). The strength of pellets prepared under the pressure 1.13 kp/cm² in a suitable mold (the size of pellets - diameter 12.0 mm, height 5.0 mm) is given as the measure of "looseness" of products, on the one hand, and of the tendency to agglomeration, on the other. The strength was determined by means of the Instron Tester apparatus (desk type) at the translational speed 5 mm/min.

TABLE I

| Example | Centrifugation r.p.m. | Overload, G | Composition, % Copolymer | H$_2$O | Plastic. | Sorption mg H$_2$O/g | Strength of pellets g/cm² |
|---|---|---|---|---|---|---|---|
| 1 | 1325 | 275 | 31.7 | 14.4 | 53.9 | 474 | 170 |
| 2 | 2650 | 1098 | 32.6 | 14.7 | 52.7 | 527 | 70 |
| 3 | 3360 | 1765 | 35.6 | 15.1 | 49.3 | 549 | 61 |
| 4 | 3900 | 2379 | 43.3 | 15.8 | 40.9 | 579 | 55 |
| 5 | 4150 | 2693 | 45.3 | 16.4 | 38.3 | 586 | 54 |

EXAMPLE 6

The laboratory malaxator with arm-stirrers (Werner-Pfleiderer) of the 2 l. volume with water-heated jacket was used for mixing of solutions containing 4 g of stearic acid in 160 g of methacrylic acid and 6 g of azobisisobutyronitrile in 800 ml of diisooctyl sebacate and 57 g of divinylbenzene. The mixture was stirred and bubbled-through with a moderate nitrogen stream for 10 min. The temperature was then raised to 57° - 62° C under stirring and nitrogen blowing and this temperature was maintained for 7 hours. The pasty mixture was cooled to 25° C and the solution containing 67 g of NaOH in 100 ml of water was added under stirring within 20 min and the mixture was homogenized by stirring for 2 hours. The lid of malaxator was then furnished with a condenser and a funnel for continuous separation of liquids, 500 ml of benzene was added into the reactor, the temperature of jacket was raised to 80° C, and the azeotropic mixture was distilled off. Benzene separated in the funnel was continuously returned into the reactor and the water layer was led into a measuring cylinder. After 98 ml of water was collected, the azeotropic distillation was stopped, the reactor lid was furnished with a descending condenser and benzene was removed by distillation (481 ml).

The resulting suspension was transfered into a vacuum filter and the content of dioctyl sebacate was lowered by suction. The powdery product obtained has the following composition:

| Copolymer | 52.6 wt.% |
| Water | traces |
| Dioctyl sebacate | 47.4 wt.% |

The pellet exhibit the strength of 45 g/cm², the sorption of water vapor was 886 mg/g.

EXAMPLE 7

The following components:

| Diisooctyl phthalate | 40.0 ml |
| butylbenzyl phthalate | 40.0 ml |
| acrylic acid | 16.0 g |
| ethyleneglycol dimethacrylate | 7.0 g |
| lauryl alcohol | 0.4 g |
| azobisisobutyronitrile | 0.6 g | have been worked on the same way as in Example 1. The polymerization was carried out for 5 hours at a temperature of 50° C. After the transformation of the product into the Na form by means of an aqueous solution of Na OH (4.44 g NaOH in 10 ml H$_2$O), the mixture was centrifuged on a laboratory centrifuge. The resulting loose powdery product had a content of less than 45% by weight of plasticizer.

We claim:
1. A method for producing powdered hydrophilic plastic filler comprising the steps of polymerizing a (1) mixture of polymerizable monomers (a) at least one of which contains from one to two carboxylic groups and is selected from the group consisting of methacrylic acid, acrylic acid, fumaric acid, maleic acid, maleic anhydride, alpha-ethylacrylic acid, citraconic acid, crotonic acid, α-chlorocrotonic acid, mesaconic acid, itaconic acid and ethylmaleic acid and (b) another of which contains at least two vinyl groups and is selected from the group consisting of ethylene glycol dimethacrylate, ethylene glycol diacrylate, diethylene glycol dimethacrylate, glycol divinyl ether, divinyl adipate, alkyl vinyl ether, dialkyl fumarate, divinyltoluene, trivinylbenzene, divinylnaphthalene, triallyl cyanurate and divinylbenzene, in a (2) medium selected from the group consisting of (a) a plasticizer, (b) a mixture of a plasticizer and up to 2 wt.%, based on the weight of said filler, of a member selected from the group consisting of (i) saturated higher fatty acids having 12 to 18 carbon atoms, (ii) unsaturated higher fatty acids having 18 carbon atoms, (iii) higher alcohols having 8 - 16 carbon atoms and (iiii) mixtures of said higher alcohols, in (3) the presence of a radical polymerization initiator, there- after converting said resulting polymer without isolation to the Na, K or NH₄ form, reducing the content of said plasticizer in said converted polymer to 20 – 70% by weight of said polymer until said polymer is a dry power.

2. Method as set forth in claim 1, wherein the saturated higher fatty acids are selected from a group comprising lauric acid, palmitic acid, and stearic acid.

3. Method as set forth in claim 1, wherein the unsaturated higher fatty acids are selected from a group comprising oleic acid, elaidic acid, linoleic acid, and linolenic acid.

4. Method as set forth in claim 1, wherein the halogenated saturated or/and unsaturated higher fatty acid contains 1 to 4 halogen atoms per one molecule of acid.

5. The method according to claim 4, wherein said fatty acid halogen is selected from the group consisting of chlorine and bromine.

6. The method according to claim 1, wherein at least one monomer (a) is in the form of an anhydride.

7. The method according to claim 1, wherein said fatty acids are unsubstituted.

8. The method according to claim 1, wherein said fatty acids are halogenated.

9. A dry powdery hydrophilic filler manufactured in accordance with claim 1.

10. The method according to claim 1, wherein said mixture contains up to 20% of water, and said water is removed from said polymer after formation of said converted polymer.

11. The method according to claim 1, wherein said plasticizer is a liquid, and is solvent for said monomers.

* * * * *